(12) United States Patent
Chu et al.

(10) Patent No.: US 11,587,575 B2
(45) Date of Patent: Feb. 21, 2023

(54) HYBRID NOISE SUPPRESSION

(71) Applicant: Plantronics, Inc., Santa Cruz, CA (US)

(72) Inventors: Peter L. Chu, Lexington, MA (US); Kwan Kin Truong, Johns Creek, GA (US)

(73) Assignee: PLANTRONICS, INC., Santa Cruz, CA (US)

( * ) Notice: Subject to any disclaimer, the term of this patent is extended or adjusted under 35 U.S.C. 154(b) by 237 days.

(21) Appl. No.: 17/025,658

(22) Filed: Sep. 18, 2020

(65) Prior Publication Data

US 2021/0110840 A1   Apr. 15, 2021

Related U.S. Application Data

(60) Provisional application No. 62/914,181, filed on Oct. 11, 2019.

(51) Int. Cl.
| | |
|---|---|
| *G10L 21/0232* | (2013.01) |
| *H04R 3/04* | (2006.01) |
| *H04M 3/56* | (2006.01) |
| *G06N 20/00* | (2019.01) |
| *H04L 65/403* | (2022.01) |
| *G06N 3/08* | (2023.01) |

(Continued)

(52) U.S. Cl.
CPC ........... *G10L 21/0232* (2013.01); *G06N 3/08* (2013.01); *G06N 20/00* (2019.01); *H04L 65/403* (2013.01); *H04M 3/568* (2013.01); *H04R 3/04* (2013.01); *G10L 2021/02082* (2013.01); *G10L 2021/02163* (2013.01)

(58) Field of Classification Search
CPC ... G10K 11/17853; G10L 15/16; G10L 15/22; G10L 21/0208; G10L 21/0232; G10L 21/0364; G10L 25/84; G10L 2021/02082; G10L 2021/02163; G10L 25/18; G10L 25/30; G10L 2021/0232; H03G 3/00; H03G 3/3005; H04L 65/403; H04L 65/80; H04M 3/568; H04M 9/082; H04R 3/04; H04R 1/1083; H04R 3/002; H04R 3/005; H04B 1/7102
USPC .......................................... 381/94.3; 704/200
See application file for complete search history.

(56) References Cited

U.S. PATENT DOCUMENTS 5,544,250 A * 8/1996 Urbanski ................. H03G 3/00
704/226
6,097,820 A * 8/2000 Turner ................ G10L 21/0208
381/94.2

(Continued)

FOREIGN PATENT DOCUMENTS

| EP | 2151822 A1 | 2/2010 |
|---|---|---|
| EP | 2226795 A1 | 9/2010 |
| WO | 2009096958 A1 | 8/2009 |

OTHER PUBLICATIONS

International Search Report issued in related International Application No. PCT/US2020/054612 dated Jan. 22, 2021 (5 pages).

(Continued)

*Primary Examiner* — Gerald Gauthier

(57) ABSTRACT

A method for hybrid noise suppression. The method involves obtaining a noisy audio input signal, generating a noise-suppressed audio output signal by performing a combination of a noise spectrum estimate-based noise suppression and a machine learning-based noise suppression, and outputting the noise-suppressed audio output signal.

18 Claims, 7 Drawing Sheets

(51) Int. Cl.
*G10L 21/0216* (2013.01)
*G10L 21/0208* (2013.01)

(56) References Cited

U.S. PATENT DOCUMENTS

| | | | | |
|---|---|---|---|---|
| 8,948,312 B2* | 2/2015 | Daneshrad | ............ | H04B 1/7102 |
| | | | | 375/322 |
| 9,099,093 B2* | 8/2015 | Choi | ................... | G10L 21/0364 |
| 9,431,023 B2* | 8/2016 | Avendano | ........... | G10L 21/0208 |
| 9,502,048 B2* | 11/2016 | Every | ..................... | G10L 25/18 |
| 11,146,607 B1* | 10/2021 | Tang | ....................... | H04L 65/80 |
| 11,158,335 B1* | 10/2021 | Ganguly | ................. | G10L 15/22 |
| 2009/0012783 A1* | 1/2009 | Klein | .................. | G10L 21/0208 |
| | | | | 704/226 |
| 2014/0126745 A1* | 5/2014 | Dickins | ................ | H04R 1/1083 |
| | | | | 381/94.3 |
| 2014/0328490 A1* | 11/2014 | Mohammad | .......... | H04M 9/082 |
| | | | | 381/66 |
| 2014/0376731 A1* | 12/2014 | Isaka | ..................... | H04R 3/005 |
| | | | | 381/71.1 |
| 2015/0110284 A1* | 4/2015 | Niemisto | ............ | G10L 21/0208 |
| | | | | 381/71.1 |
| 2015/0139433 A1* | 5/2015 | Funakoshi | ................ | H04R 3/04 |
| | | | | 381/71.1 |
| 2015/0222988 A1* | 8/2015 | Sorensen | ............ | G10L 21/0208 |
| | | | | 381/94.1 |
| 2015/0348568 A1* | 12/2015 | Li | .......................... | H04R 3/002 |
| | | | | 381/94.2 |
| 2016/0064009 A1* | 3/2016 | Every | ................. | G10L 21/0208 |
| | | | | 704/205 |
| 2018/0190280 A1* | 7/2018 | Cui | ......................... | G10L 15/16 |
| 2019/0066654 A1* | 2/2019 | Dickins | ............ | G10K 11/17853 |
| 2019/0318755 A1* | 10/2019 | Tashev | ................ | G10L 21/0232 |
| 2019/0341067 A1* | 11/2019 | Rajendran | ............... | G10L 25/30 |
| 2020/0111503 A1* | 4/2020 | Huang | ................ | G10L 21/0232 |
| 2020/0312343 A1 | 10/2020 | Hsiung | | |
| 2020/0382859 A1* | 12/2020 | Woodruff | ............. | H03G 3/3005 |
| 2020/0388297 A1* | 12/2020 | Rudberg | ................ | G10L 25/84 |
| 2021/0110840 A1* | 4/2021 | Chu | ..................... | H04L 65/403 |

OTHER PUBLICATIONS

Written Opnion of the International Searching Authority issued in related International Application No. PCT/US2020/054612 dated Jan. 22, 2021 (12 pages).

Mirsamadi, S. et al., "Causal Speech Enhancement Combining Data-Driven Learning and Suppression Rule Estimation"; Interspeech 2016, vol. 2016; Sep. 12, 2016, pp. 2870-2874 (5 pages).

Yan-Hui, T. et al., "A Hybrid Approach to Combining Conventional and Deep Learning Techniques for Single-Channel Speech Enhancement and Recognition"; 2018 International Conference on Acoustics, Speech and Signal Processing (ICASSP), IEEE, Apr. 15, 2018; pp. 2531-2535 (5 pages).

* cited by examiner

(12) United States Patent

HYBRID NOISE SUPPRESSION

CROSS REFERENCE TO RELATED APPLICATIONS

This application claims benefit under 35 U.S.C. § 119(e) to U.S. Provisional Patent Application Ser. No. 62/914,181 and filed on Oct. 11, 2019. U.S. Provisional Patent Application Ser. No. 62/914,181 is incorporated herein by reference in its entirety.

FIELD

The present disclosure relates generally to the field of acoustic signal processing. More particularly, the present disclosure relates to acoustic signal processing in teleconferencing devices.

BACKGROUND

An acoustic signal may include a signal of interest, for example speech, but the acoustic signal may also include noise. A noise suppression may be performed to attenuate the noise in the acoustic signal. The noise may include various components, such as stationary and non-stationary components. Different techniques are used individually to perform noise suppression of non-stationary noise with or without active human speech present.

SUMMARY

In general, in one aspect, one or more embodiments relate to a method for hybrid noise suppression, comprising: obtaining a noisy audio input signal; generating a noise-suppressed audio output signal by performing a combination of a noise spectrum estimate-based noise suppression and a machine learning-based noise suppression; and outputting the noise-suppressed audio output signal.

In general, in one aspect, one or more embodiments relate to a system for hybrid noise suppression, comprising: an audio source; and a computing system configured to: obtain a noisy audio input signal from the audio source; generate a noise-suppressed audio output signal by performing a combination of a noise spectrum estimate-based noise suppression and a machine learning-based noise suppression; and output the noise-suppressed audio output signal.

In general, in one aspect, one or more embodiments relate to a non-transitory computer readable medium comprising computer readable program code for hybrid noise suppression, the computer readable program code causing a computer system to: obtain a noisy audio input signal; generate a noise-suppressed audio output signal by performing a combination of a noise spectrum estimate-based noise suppression and a machine learning-based noise suppression; and output the noise-suppressed audio output signal.

Other aspects of the invention will be apparent from the following description and the appended claims.

DETAILED DESCRIPTION

Figure 1:
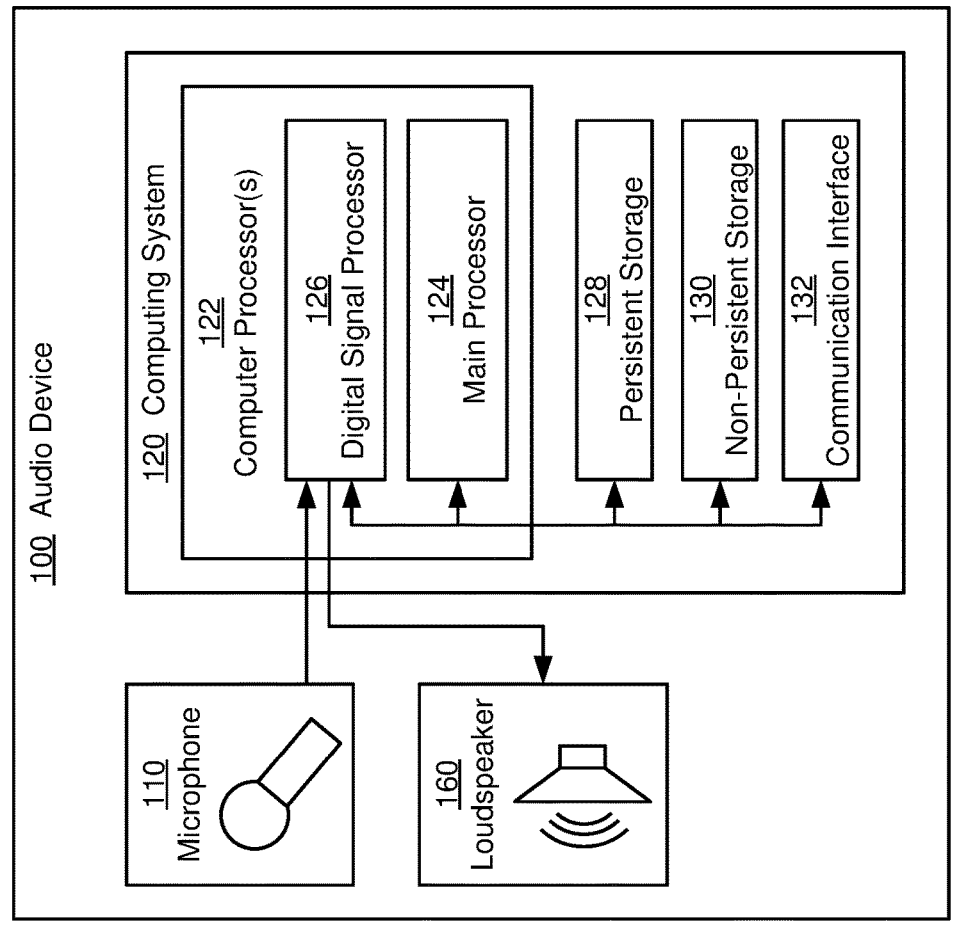
FIG. 1 shows an audio device, in accordance with one or more embodiments of the disclosure.
Figure 1:
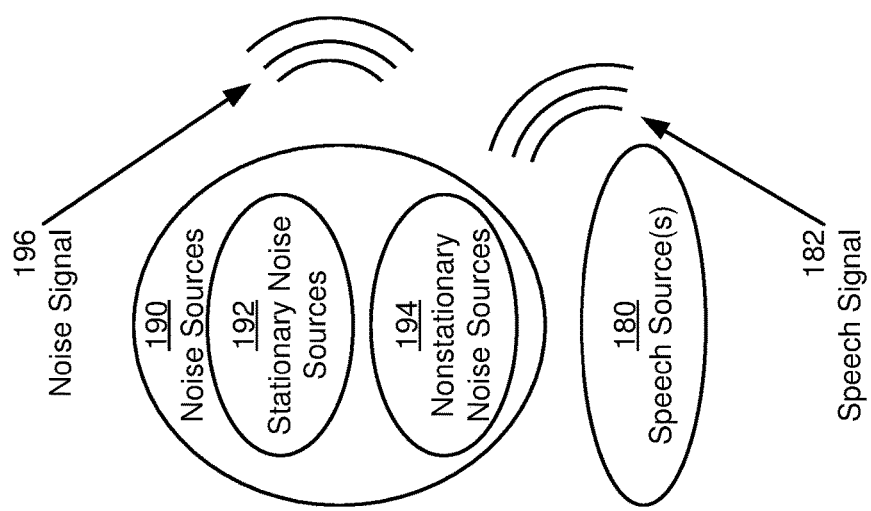

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Embodiments of the disclosure enable a processing of acoustic signals to reduce noise in the acoustic signals. In one or more embodiments, an acoustic signal includes speech and other acoustic content. The speech may be the signal of interest, whereas the other acoustic content may be considered noise. The noise may include various components, such as stationary and non-stationary components. An example for a stationary component is the continuous noise produced by a ventilation system. An example for a non-stationary component is a noise burst, e.g., as it may occur when a door is closed, when an object is dropped, etc. While the noise, stationary or non-stationary, may have very different characteristics, the common aspect is that the noise potentially degrades the signal of interest, e.g., making it harder to understand speech in a conference call.

One or more embodiments of the disclosure accept a noisy audio input signal and perform a hybrid noise suppression on the noisy audio input signal to generate a noise-suppressed audio output signal. The hybrid noise suppression, in one or more embodiments, involves a combination of a noise spectrum estimate-based noise suppression and a machine learning-based noise suppression. The combination of the two noise suppression approaches may provide a better noise suppression than the approaches performed individually. A detailed description of the hybrid noise suppression, the noisy audio input signal, and the noise-suppressed audio output signal is subsequently provided.

Turning to FIG. 1, an audio device (100) in accordance with one or more embodiments is shown. The audio device (100) may be, for example, a teleconferencing device or any other kind of device that captures audio signals, e.g., a recording device. The audio device may be equipped with a microphone (110) to pick up conversations (speech signal (182)), for example, in a conference room. The microphone may also pick up a noise signal (196). To enable two-way communications, the audio device (100) may further be equipped with a loudspeaker (160).

In one or more embodiments, the audio device (100) includes a computing system (120). The computing system (120) may include various components such as one or more computer processors (122), persistent storage (128), non-persistent storage (130), and a communication interface (132).

The one or more computer processors (122) may include one or more integrated circuits for processing instructions. For example, the computer processor(s) (122) may be one or more cores or micro-cores of a processor. The one or more computer processors (122) may include a main processor (124) and/or a digital signal processor (DSP) (126). The DSP (126) and/or the main processor (124) may process audio signals received from the microphone (110), e.g., to perform the hybrid noise suppression on the audio signals by executing one or more of the instructions described below with reference to the flowcharts of FIGS. 2-7. In addition, the DSP (126) and/or the main processor (124) may also perform operations to output an audio signal by the loudspeaker (160), e.g., when receiving audio data via the communication interface (132). The main processor (124) may further execute an operating system and may be involved in various tasks such as communications with other devices via the communication interface (132).

The persistent storage (128) may be a hard disk, an optical drive such as a compact disk (CD) drive or digital versatile disk (DVD) drive, a flash memory, etc., storing, for example, the operating system, and instructions, e.g., instructions implementing one or more of the steps of the methods described below with reference to the flowcharts of FIGS. 2-7.

The non-persistent storage (130) may be volatile memory, such as random-access memory (RAM) and/or cache memory, used when executing the steps of the methods described below.

The communication interface (132), in one or more embodiments, may include, for example, a network interface (such as an Ethernet or WLAN interface) and/or a telephone network interface (such as a public switched telephone network (PSTN) interface). Any type of communication interface that allows the transmission of audio signals in digital or analog format may be used. In case of the audio device (100) operating as a teleconferencing device, audio signals, picked up by the microphone (110) and processed by the computing system (120), may thus be sent to another remote teleconferencing device via the communication interface (132), and audio signals from the remote teleconferencing device may be received via the communication interface (132) and output by the loudspeaker (160).

In one or more embodiments, the microphone (110) picks up a speech signal (182) and a noise signal (196). The speech signal (182) may originate from one or more speakers, e.g., in a conference room or an office and may include speech. The noise signal (196) may originate from one or more noise sources (190) and may include noise. The noise of different noise sources (190) may have different characteristics. For example, the noise sources may include stationary noise sources (192) and nonstationary noise sources (194). A stationary noise source (192) may be any noise source that produces a stationary noise such as a continuous hissing, humming, buzzing, as it may be produced by heating and/or cooling systems, electronic devices, etc. A nonstationary noise source (194) may be any noise source that produces a nonstationary noise such as a clapping, hammering, knocking, or other discontinuous noise. Nonstationary noise may be environmental noise, or it may originate from a person, for example, when typing, flipping pages of a document, closing a door, dropping an object, etc. In one or more embodiments, the noise signal may be originating from any type of noise source (e.g., human, mechanical, electronic, etc. or any combination thereof). The noise signal (196) and the speech signal (182) may temporally overlap, such that the noise signal (196) becomes a background noise superimposed on the speech signal. The microphone (110) may, thus, indiscriminately pick up both the speech signal (182) and the noise signal (196) to form the noisy audio input signal. A noisy audio input signal is an input signal having audio that includes noise.

While FIG. 1 shows a configuration of components, other configurations may be used without departing from the scope of the disclosure. For example, the audio device (100) may be configured to operate as a stand-alone unit, or it may be integrated into another device such as a desktop or laptop computing device, a headset, etc. The audio device (100) may also include additional hardware and/or software components, not shown in FIG. 1.

FIG. 2, FIG. 3, FIG. 4, FIG. 5, FIG. 6, and FIG. 7 show flowcharts in accordance with one or more embodiments. One or more of the steps in FIG. 3, FIG. 4, FIG. 5A, FIG. 5B, and FIG. 6 may be performed by various components of the audio device, previously described with reference to FIG. 1.

While the various steps in these flowcharts are presented and described sequentially, one of ordinary skill will appreciate that some or all of the steps may be executed in different orders, may be combined or omitted, and some or all of the steps may be executed in parallel. Additional steps may further be performed. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Accordingly, the scope of the disclosure should not be considered limited to the specific arrangement of steps shown in FIG. 2, FIG. 3, FIG. 4, FIG. 5, FIG. 6, and FIG. 7.

Figure 2:
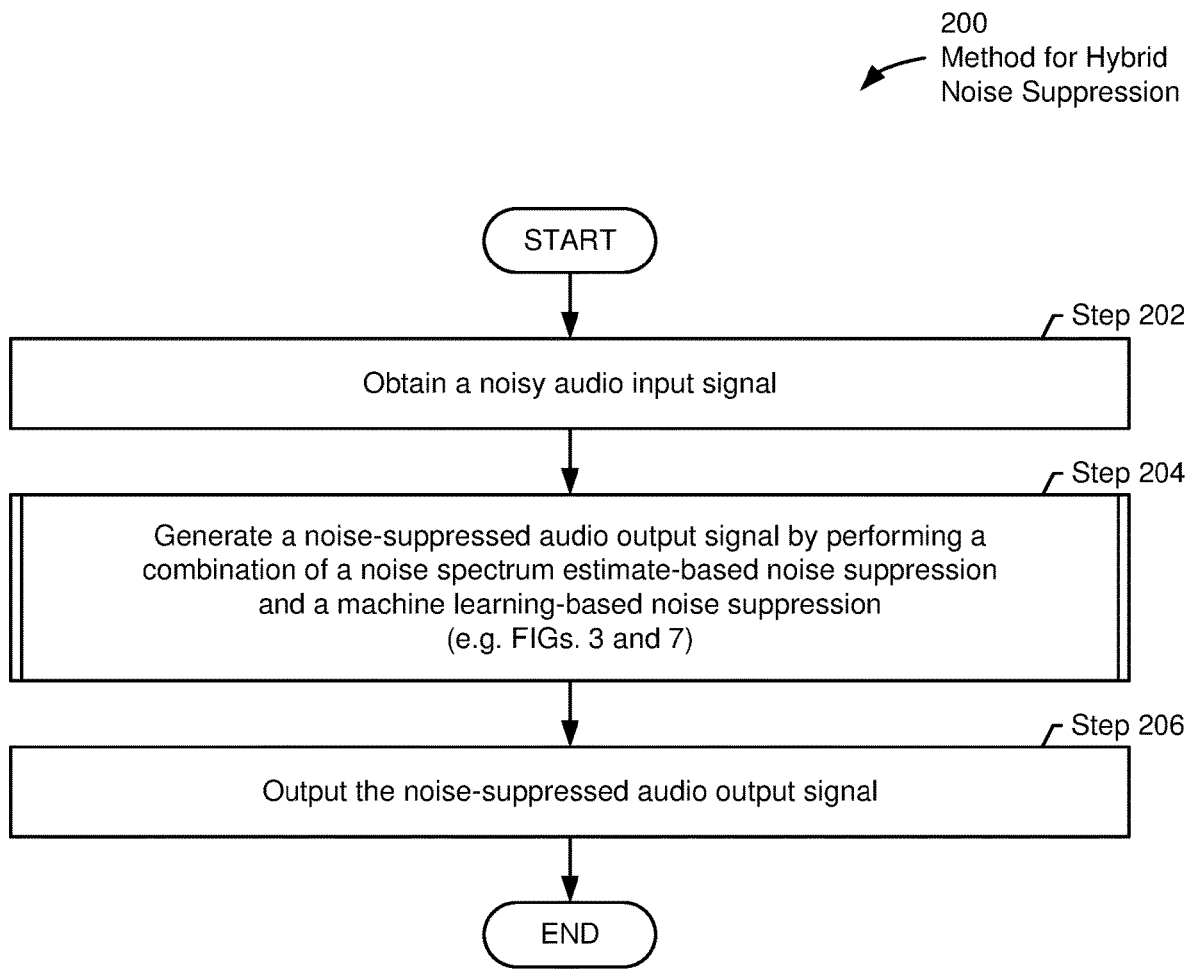
FIG. 2 shows a flowchart describing a method for hybrid noise suppression, in accordance with one or more embodiments of the disclosure.

Turning to the flowchart of FIG. 2, a method (200) for hybrid noise suppression, in accordance with one or more embodiments, is shown. Broadly speaking, the method may process a noisy audio input signal to obtain a noise-suppressed audio output signal. The processing is performed by two complementary approaches in combination, as described below. The subsequent figures (FIG. 3, FIG. 4, FIG. 5, FIG. 6, and FIG. 7) describe different combinations of the two approaches.

In Step 202, a noisy audio input signal is obtained from an audio source. As previously noted, the noisy audio input signal may include a signal of interest (e.g. speech), and a noise signal. The noise signal may include stationary and/or nonstationary noise. In one embodiment, the noisy audio input signal is obtained by capturing an audio signal using a microphone. Alternatively, the noisy audio input signal may be obtained from elsewhere, e.g., from an audio recording. The obtaining of the noisy audio input signal may further include segmenting the noisy audio input signal. For example, the segmenting may split the noisy audio input signal into segments of a duration of, e.g., 10 msec or 20 msec. Accordingly, the subsequently described operations may be performed on short segments of the noisy audio input signal. By repeating the operations for a set of consecutive short segments, a noisy audio input signal of any duration may be processed.

In Step 204, a noise-suppressed audio output signal is generated by performing a combination of a noise spectrum estimate-based noise suppression and a machine learning-based noise suppression. The noise spectrum estimate-based noise suppression and the machine learning-based noise suppression are subsequently described. Additional details are provided below, with reference to FIG. 3 and FIG. 7.

Noise Spectrum Estimate-Based Noise Suppression

In the noise spectrum estimate-based noise suppression approach, the noisy audio input signal (or noisy speech signal) may be expressed as the sum of the clean speech, x, and background noise, s:

$$y_{noisy}[n] = x_{clean}[n] + s_{noise}[n], \quad (1)$$

where n is the discrete time domain sample index, n=0 . . . M−1. For example, M may be between 10 and 20 msec. The frequency domain of the corresponding variables in Equation (1) may be written as:

$$Y[k] = X[k] + S[k], \quad (2)$$

where k is the discrete frequency domain index, k=0 . . . N−1. A Fast Fourier Transform (FFT) may be performed to transform the noisy audio input signal from the time domain to the frequency domain. N may be the FFT size that establishes the number of sub-bands in the frequency domain. In one embodiment, a 48 kHz sampling frequency is used to operate in a frequency range of 0-24 kHz, and 960 sub-bands of equal width are generated for the frequency range of 0-24 kHz. Any other frequency range and any other number of sub-bands may be used, without departing from the disclosure. Once transformed to the frequency domain, a spectral subtraction noise suppression may be defined as finding a set of sub-band scalar gain values such that an estimated clean audio signal may be approximated as:

$$\hat{X}[k] = g[k]Y[k] = \frac{|Y[k]| - |\hat{S}[k]|}{|Y[k]|} Y[k]. \quad (3)$$

$|\hat{S}[k]|$ is the estimated background noise spectral magnitude of the $k^{th}$ sub-band. Thus, the noise-spectrum estimate-based noise suppression approach includes two steps: (1) estimate the background noise spectral magnitude, and (2) compute a set of sub-band gain values {g [k], k=0 . . . N−1} using the ratio as defined in Equation (3). The first step of performing the estimation of the background noise spectral magnitude may be accomplished, for example, by observing the stationary noise energy in sub-bands using long-term measures of minimum energy, e.g., over a time span longer than the 10-20 msec intervals that an algorithm based on Equation (3) would operate on. For example, a prolonged time interval of a second, multiple seconds, or longer, may be considered. An interval where minimum energy is observed within the prolonged time interval, may be assumed to include background noise but not speech. In the second step, the sub-band gain values may be determined by the ratio of the current energy to that of the estimated noise energy in that sub-band. A high ratio may imply a high gain and a low ratio may imply a low gain. In other words, the computed sub-band gain values may be low for those sub-bands whose content is mostly noise, and high for those sub-bands whose content is mostly speech. By applying the sub-band gain values to the sub-bands, e.g., by multiplying each of the sub-bands with the corresponding sub-band gain values, a re-shaping of the spectrum, in the frequency domain is performed. Essentially, the spectrum is reshaped from "noisy" (including background noise) to "clean" (excluding background noise, while still including speech). A sub-band gain value of "0" may completely attenuate the content in the sub-band, whereas a sub-band gain value of "1" may pass all content in the sub-band without attenuation.

In one or more embodiments, the noise-spectrum estimate-based noise suppression approach is particularly effective at removing stationary background noise. For example, in one scenario, 10 dB of stationary background noise (e.g., HVAC, fan, ambience, etc.) were effectively removed.

Machine Learning-Based Noise Suppression

The noisy speech signal may be rewritten to include impulsive noise and ambience (background) noise as:

$$y_{noisy}[n] = x_{clean}[n] + s_{ambience}[n] + s_{impulsive}[n]. \quad (4)$$

In the machine learning-based noise suppression approach, a neural network model (e.g., a deep neural network model) may be used to predict noise suppressing sub-band gain values. As further discussed below, a neutral network model may be particularly effective at suppressing the impulsive noise, $s_{impulsive}$. Analogous to the noise spectrum estimate-based noise suppression approach, the machine learning-based noise suppression approach is based on a set of sub-bands in the frequency domain. In one embodiment, a 48 kHz sampling frequency is used to operate in a frequency range of 0-24 kHz, and 480 sub-bands of equal width are generated for the frequency range of 0-24 kHz. Any other frequency range and any other number of sub-bands may be used, without departing from the disclosure. A feature vector is subsequently generated to form the input to the neural network model. The feature vector may consist of values of the sub-bands in the frequency domain, and/or other values derived from the sub-bands in the frequency domain. For example, particular sub-bands may be selected to mimic the psychoacoustic domain of human hearing. Based on the feature vector, the neural network model may predict a sub-band gain value for each of the sub-bands. The predicted sub-band gain values may be low for those sub-bands whose content is mostly noise, and high for those sub-bands whose content is mostly speech. A sub-band gain value of "0" may completely attenuate the content in the sub-band, whereas a sub-band gain value of "1" may pass all content in the sub-band without attenuation. The sub-band gain values are the "predicted" output of a highly non-linear mapping of the neural network model.

Thus, in case of the machine learning-based noise suppression approach, the estimated clean speech may be expressed as:

$$\hat{X}[k]=g[k]Y[k]=D\ N\ N(k, f[u_0, u_1, \ldots u_p])Y[k], \quad (5)$$

where $f[u_1, u_2, \ldots, u\_p]$ is the feature vector extracted based on the noisy speech spectrum Y[k].

The sub-band gain values, g[k], produced by the neural network model, DNN, in an additional step may further be tuned to increase or reduce an attenuation. For example, sub-band gain values associated with individual sub-bands may be smoothed over time when fluctuating within a certain range, between consecutive executions of an algorithm based on Equation (5). The smoothing may be performed using a filter such as an infinite impulse response (IIR) filter. The smoothing may be skipped when a sub-band gain value changes beyond a specified limit (e.g., a sudden change from a relatively high gain to a much lower gain may be desirable to attenuate a nonstationary noise such as a tap event).

In one embodiment, the neural network model, DNN, by which the sub-band gain values are determined based on the feature vector is a deep neural network and may include, for example, three dense layers and three recurrent layers. The deep neural network may include gated recurrent units. Any other type of neural network model may be used without departing from the disclosure.

Prior to the neural network model being used, the neural network model may require training. The training may be based on real or synthetic data, e.g., hours of clean speech and noise data. The training may be performed by executing the neural network model on a mix of clean speech (i.e., speech without noise) and noise, serving as the training input. The outputted sub-band gain values may then be evaluated to assess their performance in terms of attenuating the noise in the mix of clean speech and noise to obtain an estimate of the clean speech. A loss function is applied to differences between the estimate of the clean speech and the corresponding actual clean speech. A gradient decent algorithm may be used to update weights in the neural network model. By way of an example, the gradient decent algorithm may be the Adam (Adaptive Moment Estimation) algorithm. The training is continued until the neural network model are deemed sufficiently trained (e.g., when the neural network model reaches a predictive performance deemed sufficient). The neural network model may be periodically retrained, e.g., to address a new type of noise.

In one or more embodiments, the machine learning-based noise suppression approach is particularly effective at removing nonstationary background noise (like keyboard typing, paper rustling, crowd noise), based on the highly non-linear mapping of the neural network model. Accordingly, with the noise-spectrum estimate-based noise suppression approach providing superior suppression of stationary noise, and the machine learning-based noise suppression approach providing superior suppression of nonstationary noise, in one or more embodiments, the two approaches are combined to provide superior noise suppression of bot stationary noise, $S_{ambience}[n]$, and non-stationary noise, $S_{impulsive}[n]$, in Equation (4), in a complementary manner. The two approaches may be combined in different manners, as further discussed below with reference to FIG. 3 and FIG. 7.

In Step 206, the noise-suppressed audio output signal is outputted. The nature of the output operation in Step 206 depends on the type of the audio device performing the method of FIG. 2. In case of a teleconferencing system, the teleconferencing device may send the noise-suppressed audio output signal to a remote teleconferencing device. In case of an audio recording device, the noise-suppressed audio output signal may be stored to a non-volatile memory.

Figure 3:
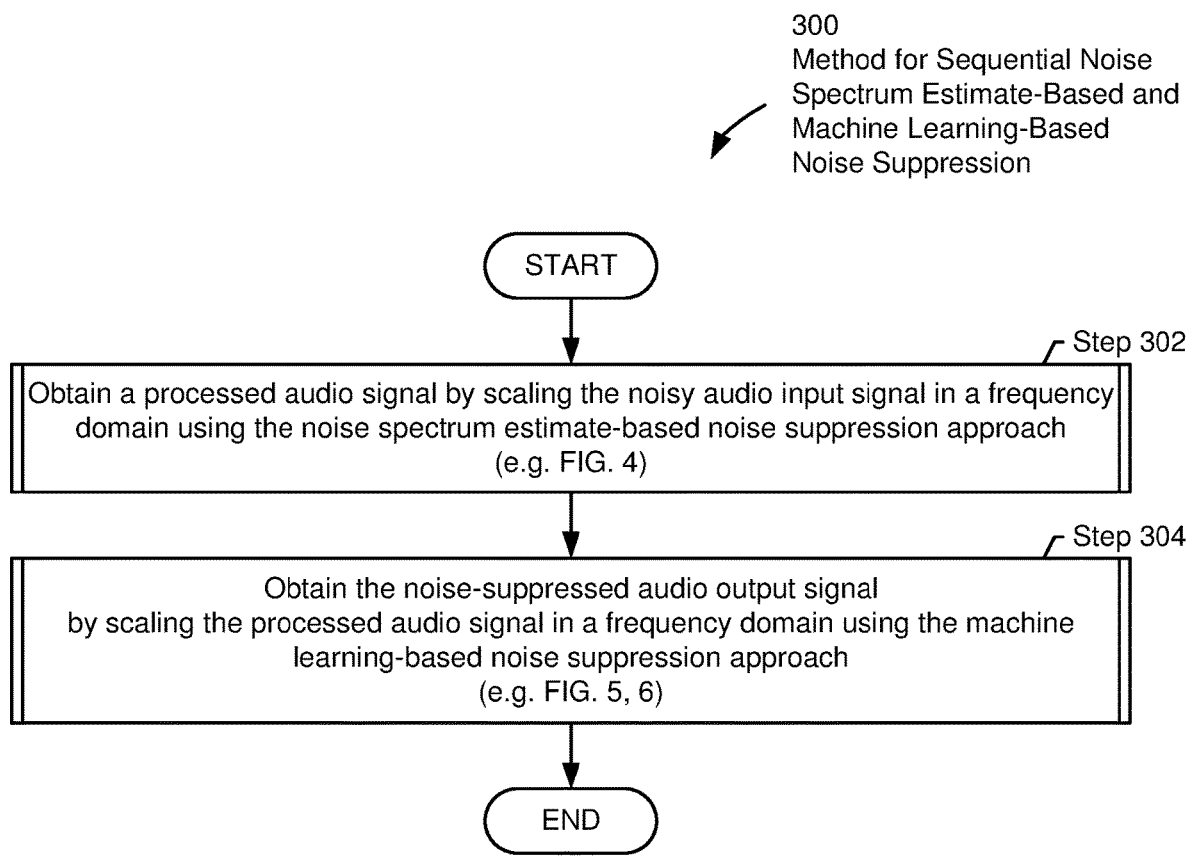
FIG. 3 shows a flowchart describing a method for sequential noise spectrum estimate-based and machine learning-based noise suppression, in accordance with one or more embodiments of the disclosure.

Turning to the flowchart of FIG. 3, a method (300) for a sequential noise spectrum estimate-based and machine learning-based noise suppression, in accordance with one or more embodiments, is shown. The noise spectrum estimate-based noise suppression algorithm and the machine learning-based noise suppression algorithm are combined in a particular manner to ensure proper function. Specifically, the two algorithms are cascaded in a manner allowing them to both operate on the undistorted (unprocessed) noisy input signal instead of one algorithm entirely operating on the output of the other algorithm.

In Step 302, a processed audio signal is obtained by scaling the noisy audio input signal in a frequency domain using the noise spectrum estimate-base noise suppression approach. A detailed description of Step 302 is provided below, with reference to FIG. 4.

In Step 304, the noise-suppressed audio output signal is obtained by scaling the processed audio signal in a frequency domain using the machine learning-based noise suppression approach. A detailed description of Step 304 is provided below, with reference to FIG. 5 and FIG. 6. The method described in FIG. 5 involves a neural network model that operates on the noisy audio input signal to obtain a set of sub-band gain values used to scale the processed audio signal, in accordance with one or more embodiments. In contrast, the method described in FIG. 6 involves a neural network model that operates on the processed audio signal, to obtain a set of sub-band gain values used to scale the processed audio signal, in accordance with one or more embodiments.

Figure 4:
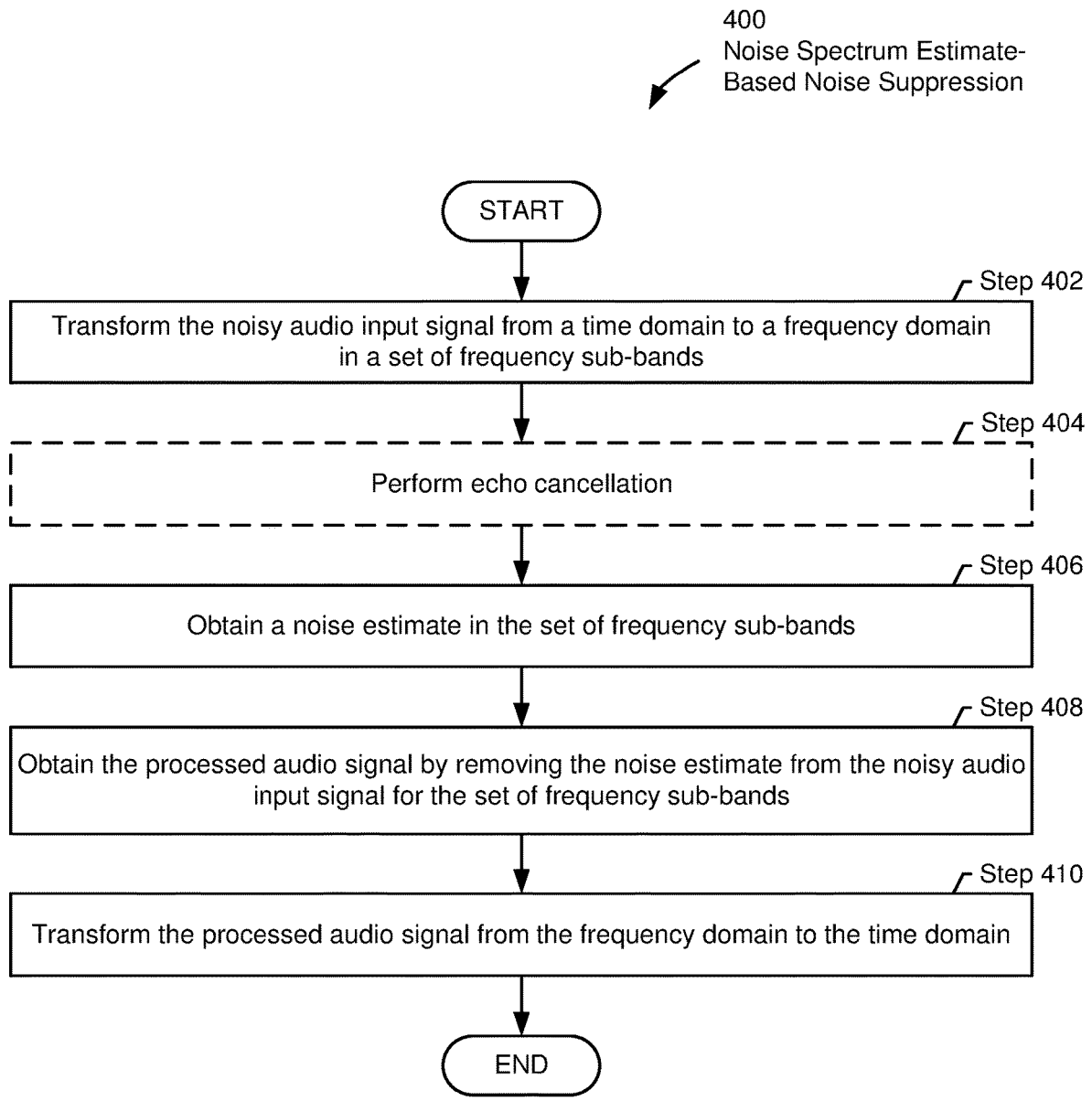
FIG. 4 shows a flowchart describing a method for noise spectrum estimate-based noise suppression, in accordance with one or more embodiments of the disclosure.

Turning to the flowchart of FIG. 4, a method (400) for a noise spectrum estimate-based noise suppression, in accordance with one or more embodiments, is shown. The method relates to the noise spectrum estimate-based noise suppression approach previously described with reference to FIG. 2, where, in Step 204, the noise spectrum estimate-based noise suppression approach, but also a machine learning-based noise suppression approach, are described.

In Step 402, an echo cancellation may be performed. The echo cancellation may be performed using an adaptive filter for linear processing and an echo suppressor for nonlinear processing, and performance of the echo cancellation is optional.

In Step 404, the noisy audio input signal is transformed from the time domain to the frequency domain, in a set of frequency sub-bands. As previously described, the transformation may be performed using a Fast Fourier Transform (FFT), e.g., in a frequency range of 0-24 kHz, with 960 frequency sub-bands of equal width.

In Step 406, a noise estimate is obtained in the set of frequency sub-bands. As previously described, the noise may be estimated for each of the frequency sub-bands. In one embodiment, the sub-bands are analyzed over a longer time (e.g., a second or multiple seconds) for minimum energy. The values in the frequency sub-bands at the point in time where the minimum energy is detected may be assumed to represent background noise but not speech. Accordingly, these values for the set of frequency sub-bands may be used as the noise estimate.

In Step 408, the processed audio signal is obtained by removing the noise estimate from the noisy audio input signal for the set of frequency sub-bands. As previously described, a sub-band gain value may be determined for each of the sub-bands based the ratio of the current energy in the sub-band to the energy of the noise estimate in that sub-band. The obtained sub-band gain values may be applied to the noisy audio input signal, e.g., by multiplying the noisy audio input signal in each of the frequency sub-bands by the sub-band gain values, to obtain a processed audio signal, for the set of frequency sub-bands.

In Step 410, the processed audio signal in the set of frequency sub-bands is transformed from the frequency domain to the time domain. An Inverse Fast Fourier Transform (IFFT) may be used to perform Step 410. Under certain circumstances, Step 410 may be skipped. For example, in configurations that use the same frequency domain (same configuration of sub-bands) for the noise spectrum estimate-based noise suppression approach and for the subsequently performed machine learning-based noise suppression approach, Step 410 may be skipped. Step 410 may, in addition, also be performed on the noisy audio input signal after the echo cancellation performed in Step 404.

Figure 5:
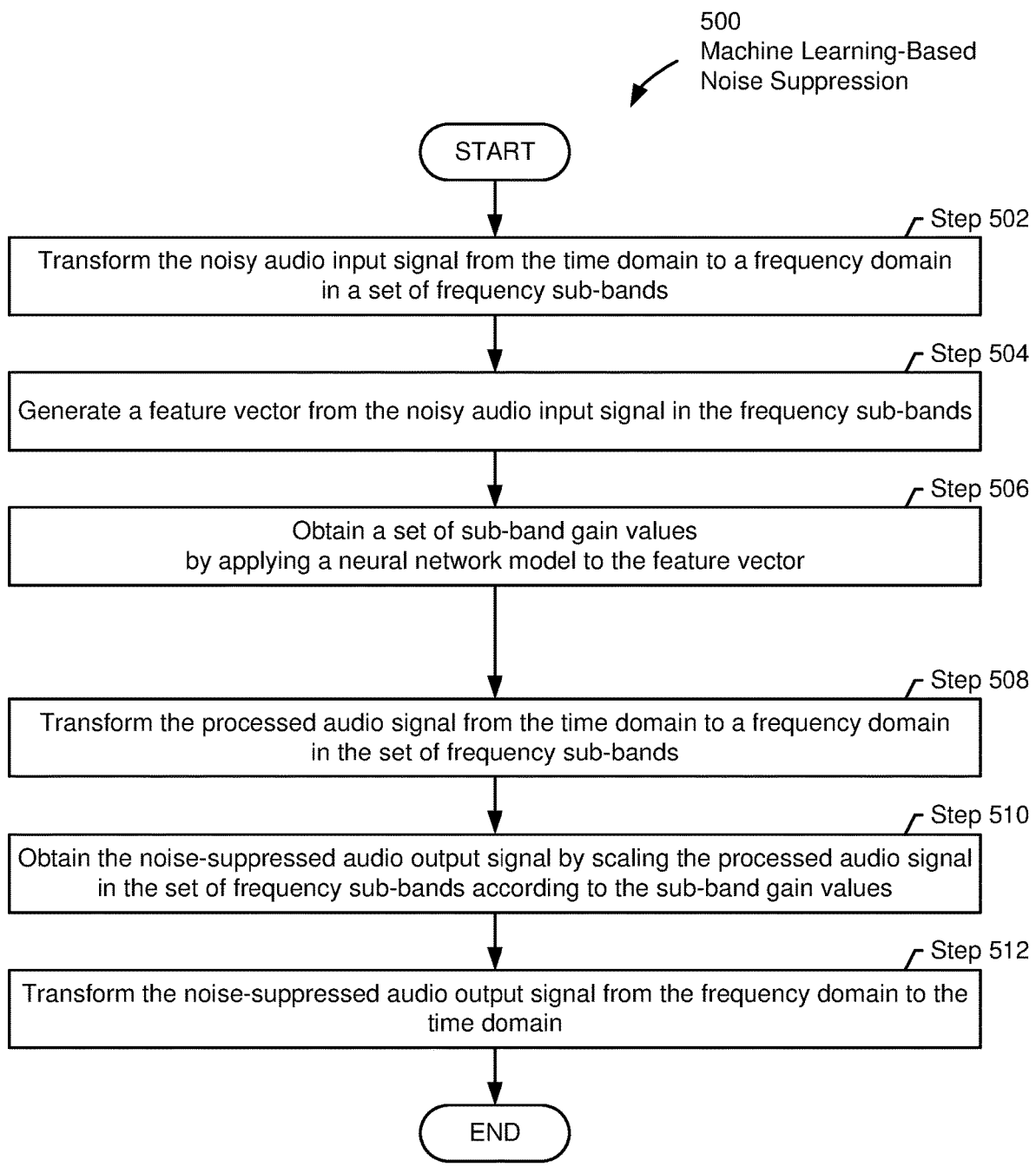
FIG. 5 shows a flowchart describing a method for machine learning-based noise suppression, in accordance with one or more embodiments of the disclosure.

Turning to the flowchart of FIG. 5, a method (500) for a machine learning-based noise suppression, in accordance with one or more embodiments, is shown. The method relates to the machine learning-based noise suppression approach previously described with reference to FIG. 2, where, in Step 204, the machine learning-based noise suppression approach, but also a noise spectrum estimate-based noise suppression approach, are described. Briefly summarized, the method (500) involves a neural network model that operates on the noisy audio input signal, to obtain a set of sub-band gain values used to scale the processed audio signal, in accordance with one or more embodiments.

In Step 502, the noisy audio input signal is transformed from the time domain to the frequency domain, in a set of frequency sub-bands. As previously described, the transformation may be performed using a Fast Fourier Transform (FFT) e.g., in a frequency range of 0-24 kHz, with 480 frequency sub-bands of equal width. If the sub-band configuration to be used for the method (500) is identical to the sub-band configuration used for the method (400), Step 502 may be skipped. The method (500) may then be performed based on the time domain to frequency domain transformation performed in Step 402 of the method (400). In one or more embodiments, Step 502 is performed on the noisy audio input signal after the echo cancellation of Step 404, followed by a transformation to the time domain, as described in Step 410.

In Step 504, a feature vector is generated to form the input to the neural network model. As previously described with reference to FIG. 2, the feature vector may consist of the values of the sub-bands in the frequency domain, and/or other values derived from the sub-bands in the frequency domain.

In Step 506, a sub-band gain value is predicted for each of the sub-bands by a neural network model, based on the feature vector, as previously described with reference to FIG. 2.

In Step 508, the processed audio signal is transformed from the time domain to the frequency domain, in a set of frequency sub-bands. As previously described, the transformation may be performed using a Fast Fourier Transform (FFT) e.g., in a frequency range of 0-24 kHz, with 480 frequency sub-bands of equal width. If the sub-band configuration to be used for the method (500) is identical to the sub-band configuration used for the method (400), Step 508 may be skipped. The method (500) may then be performed using the processed audio signal obtained in Step 408, without transforming the processed audio signal back to the time domain, in Step 410.

In Step 510, the noise-suppressed audio output signal is obtained by scaling the processed audio signal in the set of frequency sub-bands according to the sub-band gain values obtained in Step 506, as previously described with reference to FIG. 2.

In Step 512, the noise-suppressed audio output signal in the set of frequency sub-bands is transformed from the frequency domain to the time domain. An Inverse Fast Fourier Transform (IFFT) may be used to perform Step 512.

While not shown in the flowchart of FIG. 5, a training of the neural network model may be performed at some point in time, prior to the execution of Step 506. Broadly speaking, the training may be performed as described with reference to FIG. 2. The training may be based on the noisy audio input signal serving as the training input. The training based on the noisy audio input signal enables the prediction of the sub-band gain values in Step 506, which is also based on the noisy audio input signal.

When performing the machine learning-based noise suppression (500), for optimum performance, there should be temporal alignment between the processed audio signal in the frequency sub-bands and the sub-band gain values used for scaling the processed audio signal in the set of frequency sub-bands. In one embodiment, temporal alignment is accomplished through application of processing steps that introduce the same time delay for both the obtaining of the sub-band gain values in Step 506 and the obtaining of the processed audio signal used in Step 510. Specifically, the time delay encountered toward obtaining the sub-band gain values is a result of the execution of Step 402 (transformation to frequency domain), Step 410 (transformation to time domain), and Step 502 (transformation to frequency domain). The same time delay is encountered toward obtaining the processed audio signal used in Step 510, as a result of the execution of Step 402 (transformation to frequency domain), Step 410 (transformation to time domain), and Step 508 (transformation to frequency domain).

Figure 6:
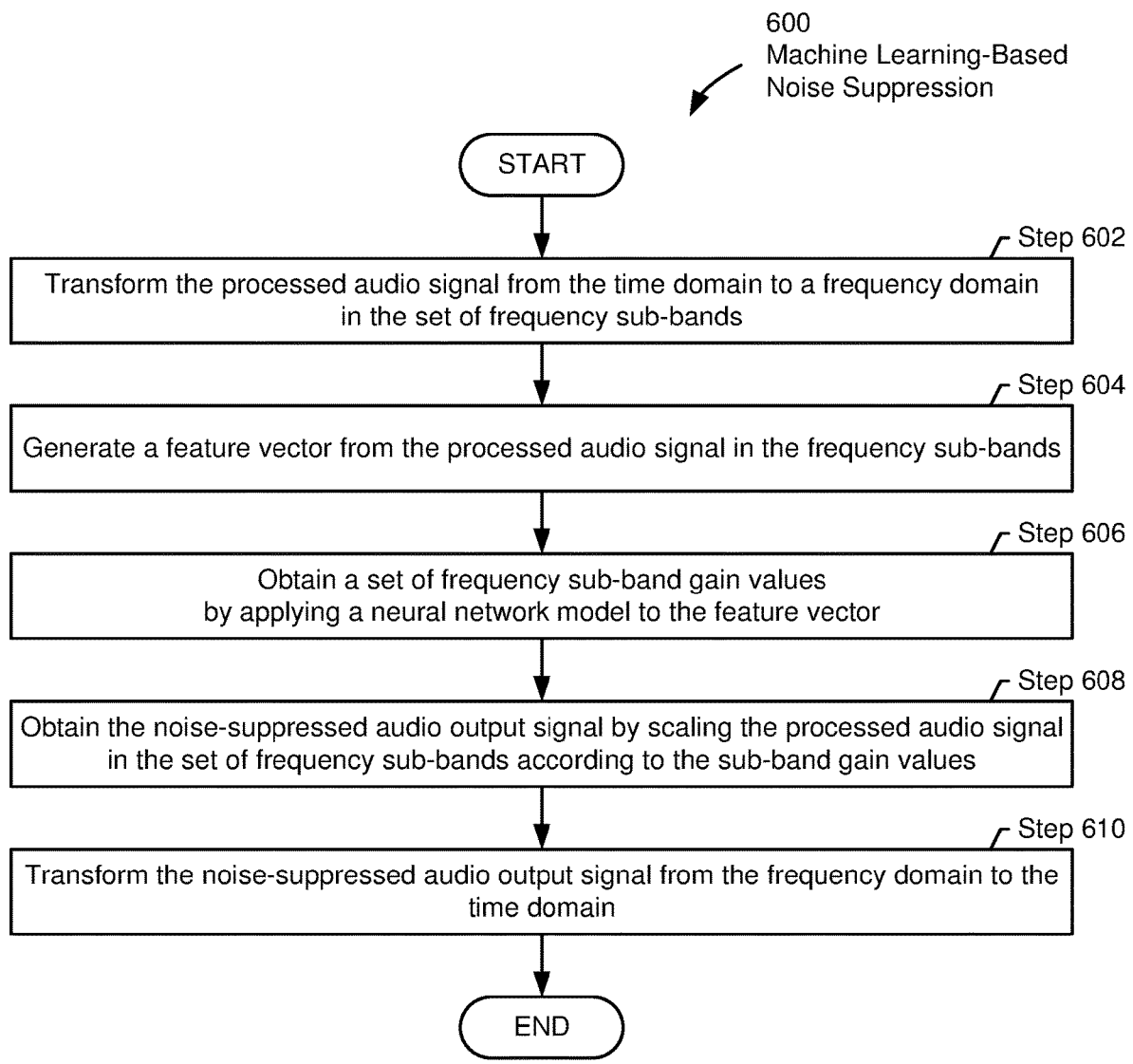
FIG. 6 shows a flowchart describing a method for machine learning-based noise suppression, in accordance with one or more embodiments of the disclosure.

The use of the noisy audio input signal (as shown in FIG. 5) instead of the processed audio signal (as shown in FIG. 6) as the input to the neural network model may enable the combination of the noise spectrum estimate-based noise suppression approach and the machine learning-based noise suppression approach to synergistically suppress stationary noise, while also obtaining an attenuation of nonstationary noise by the machine learning-based noise suppression approach. In one implementation, the combined suppression of stationary noise was found to be 6 dB greater than when using the noise spectrum estimate-based noise suppression approach or the machine learning-based noise suppression approach alone.

Turning to the flowchart of FIG. 6, a method (600) for a machine learning-based noise suppression, in accordance with one or more embodiments, is shown. The method relates to the machine learning-based noise suppression approach previously described with reference to FIG. 2. Briefly summarized, the method (600) involves a neural network model that operates on the processed audio signal, to obtain a set of sub-band gain values used to scale the processed audio signal, in accordance with one or more embodiments.

In Step 602, the processed audio signal is transformed from the time domain to the frequency domain, in a set of frequency sub-bands. As previously described, the transformation may be performed using a Fast Fourier Transform (FFT) e.g., in a frequency range of 0-24 kHz, with 480 frequency sub-bands of equal width. If the sub-band configuration to be used for the method (600) is identical to the sub-band configuration used for the method (400), Step 602 may be skipped. The method (500) may then be performed based on the processed audio signal in the frequency domain, generated in Step 408.

In Step 604, a feature vector is generated to form the input to the neural network model. As previously described with reference to FIG. 2, the feature vector may consist of the values of the sub-bands in the frequency domain, and/or other values derived from the sub-bands in the frequency domain.

In Step 606, a sub-band gain value is predicted for each of the sub-bands by a neural network model, based on the feature vector, as previously described with reference to FIG. 2.

In Step 608, the noise-suppressed audio output signal is obtained by scaling the processed audio signal in the set of frequency sub-bands according to the sub-band gain values obtained in Step 606, as previously described with reference to FIG. 2.

In Step 610, the noise-suppressed audio output signal in the set of frequency sub-bands is transformed from the frequency domain to the time domain. An Inverse Fast Fourier Transform (IFFT) may be used to perform Step 610.

While not shown in the flowchart of FIG. 6, a training of the neural network model may be performed at some point in time, prior to the execution of Step 606. Broadly speaking, the training may be performed as described with reference to FIG. 2. The training may be based on the processed audio signal serving as the training input. The training based on the processed audio signal enables the prediction of the sub-band gain values in Step 606, which is also based on the processed audio signal.

The use of the processed audio signal (as shown in FIG. 6) instead of the noisy audio input signal (as shown in FIG. 5) as the input to the neural network model may enable the training of the neural network model to "focus" on the suppression of non-stationary noise, because at least some of the stationary noise of the noisy audio input signal is not present in the processed audio signal. Accordingly, a neural network model of the same configuration (same architecture, same number of neurons) may perform better in the suppression of non-stationary noise when operating on the processed audio signal, in comparison to operating on the noisy audio input signal.

Figure 7:
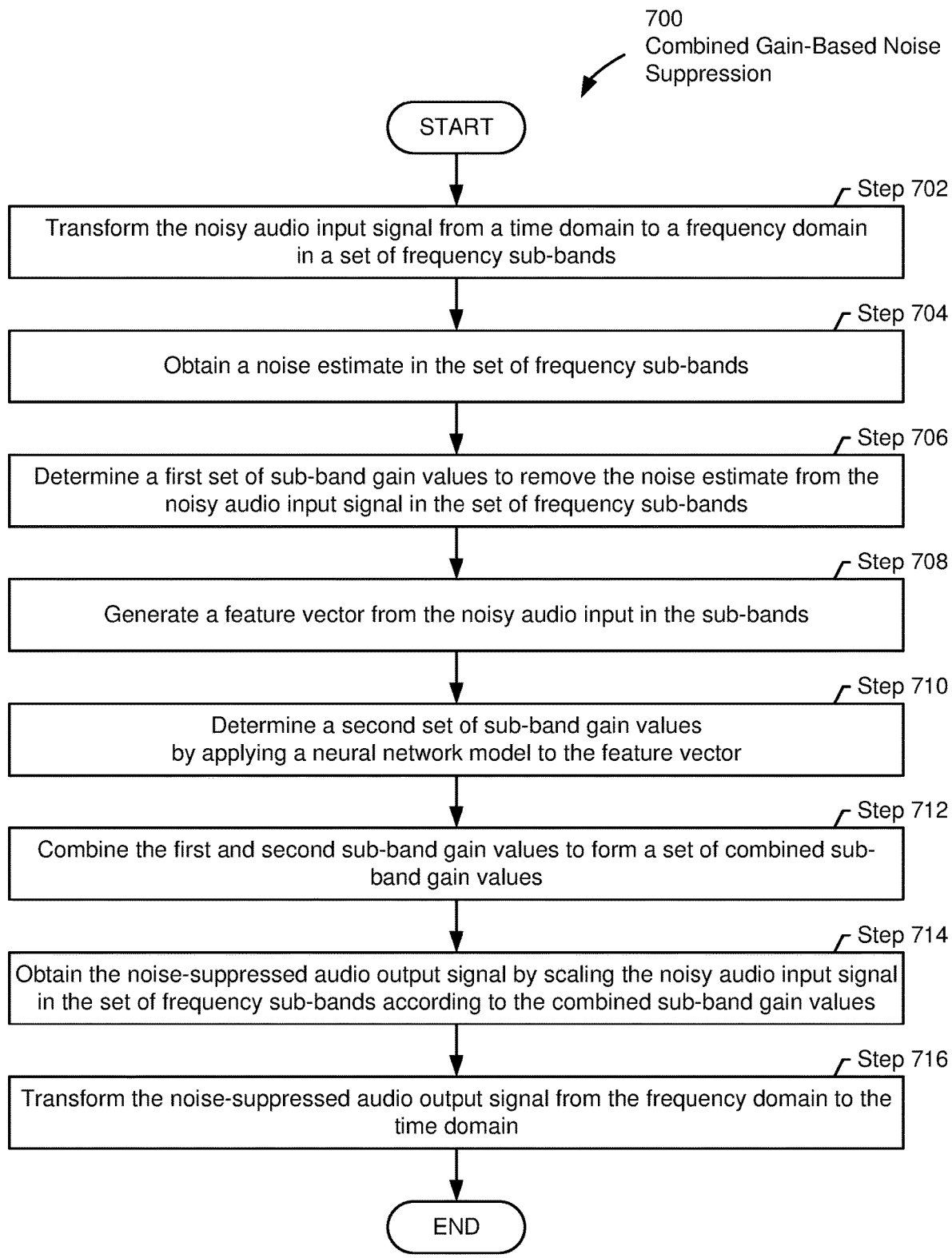
FIG. 7 shows a flowchart describing a method for a combined gain-based noise suppression, in accordance with one or more embodiments.

Turning to the flowchart of FIG. 7, a method (700) for a combined gain-based noise suppression, in accordance with one or more embodiments, is shown. The method relates to the noise spectrum estimate-based noise suppression approach and the machine learning-based noise suppression approach previously described with reference to FIG. 2. Briefly summarized, unlike the previously described methods which separately obtain sets of sub-band gain values that are applied in separate operations to obtain the noise suppression, the method (700) obtains a set of combined sub-band gain values from the noise spectrum estimate-based noise suppression approach and the machine learning-based noise suppression approach, which are applied in a single operation to obtain the noise suppression.

In Step 702, the noisy audio input signal is transformed from the time domain to the frequency domain, in a set of frequency sub-bands. As previously described, the transformation may be performed using a Fast Fourier Transform (FFT) e.g., in a frequency range of 0-24 kHz, and a certain number of frequency sub-bands of equal width, e.g., 480 or 960 sub-bands.

In Step 704, a noise estimate is obtained in the set of frequency sub-bands. As previously described, the noise may be estimated for each of the frequency sub-bands. In one embodiment, the sub-bands are analyzed over a longer time (e.g., a second or multiple seconds) for minimum energy. The values in the frequency sub-bands at the point in time where the minimum energy is detected may be assumed to represent background noise but not speech. Accordingly, these values for the set of frequency sub-bands may be used as the noise estimate.

In Step 706, a first set of sub-band gain values is determined. The first set of sub-band gain values is selected to remove the noise estimate from the noisy audio input signal in the set of frequency sub-bands by a scaling operation, as previously discussed. Steps 702-706 correspond to the noise spectrum estimate-based noise suppression as introduced with reference to FIG. 2, where, in Step 204, the noise spectrum estimate-based noise suppression approach, but also a machine learning-based noise suppression approach, are described. Thus, the first set of sub-band gain values correspond to noise spectrum estimate-based noise suppression.

In Step 708, a feature vector is generated to form the input to the neural network model. As previously described with reference to FIG. 2, the feature vector may consist of the values of the sub-bands in the frequency domain, and/or other values derived from the sub-bands in the frequency domain.

In Step 710, a second set of sub-band gain values is predicted. The second set of sub-band gain values includes one sub-band gain value for each of the sub-bands, predicted by a neural network model, based on the feature vector, as previously described with reference to FIG. 2. Steps 708-710 correspond to the machine learning-based noise suppression as introduced with reference to FIG. 2, where, in Step 204, the machine learning-based noise suppression approach, but also a noise spectrum estimate-based noise suppression approach, are described. Thus, the second set of sub-band gain values correspond to machine learning-based noise suppression.

In Step 712, the first set of sub-band gain values and the second set of sub-band gain values are combined to form a set of combined sub-band gain values. The combination may be performed by addition, individually, in each of the sub-bands.

In Step 714, the noise-suppressed audio output signal is obtained by scaling the processed audio signal in the set of frequency sub-bands according to the combined sub-band gain values obtained in Step 712, as previously described with reference to FIG. 2.

In Step 716, the noise-suppressed audio output signal in the set of frequency sub-bands is transformed from the frequency domain to the time domain. An Inverse Fast Fourier Transform (IFFT) may be used to perform Step 716.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for hybrid noise suppression, comprising:
obtaining a noisy audio input signal;
generating a noise-suppressed audio output signal by performing a combination of a noise spectrum estimate-based noise suppression and a machine learning-based noise suppression, wherein performing further comprises:

obtaining a processed audio signal by scaling the noisy audio input signal in a first frequency domain using the noise spectrum estimate-based noise suppression;

scaling the processed audio signal in a second frequency domain using the machine learning-based noise suppression; and outputting the noise-suppressed audio output signal.

2. The method of claim 1, wherein obtaining the processed audio signal by scaling the noisy audio input signal in the first frequency domain using the noise spectrum estimate-based noise suppression comprises:

transforming the noisy audio input signal from a time domain into the first frequency domain comprising a plurality of frequency sub-bands;

obtaining a noise estimate in the plurality of frequency sub-bands;

obtaining the processed audio signal by removing the noise estimate from the noisy audio input signal for the plurality of frequency sub-bands; and transforming, after obtaining the processed audio signal, the processed audio signal from the first frequency domain to the time domain.

3. The method of claim 1, wherein the obtaining the noise spectrum estimate comprises:

identifying an interval of minimum energy in the noisy audio input signal.

4. The method of claim 1, wherein obtaining the noise-suppressed audio output signal by scaling the processed audio signal in the second frequency domain using the machine learning-based noise suppression comprises:

transforming the noisy audio input signal from a time domain into the second frequency domain comprising a plurality of frequency sub-bands;

generating a feature vector from the noisy audio input signal in the plurality of frequency sub-bands;

obtaining a set of sub-band gain values by applying a neural network model to the feature vector;

transforming the processed audio signal from the time domain into the second frequency domain comprising the plurality of frequency sub-bands;

scaling, according to the sub-band gain values, the processed audio signal in the plurality of frequency sub-bands to generate the noise-suppressed audio output signal; and transforming, after scaling according to the sub-band gain values, the noise-suppressed audio output signal from the second frequency domain to the time domain.

5. The method of claim 4, further comprising, prior to transforming the noisy audio input signal from the time domain to the second frequency domain:

performing an echo cancellation on the noisy audio input signal in the first frequency domain; and transforming, after the echo cancellation, the noisy audio input signal from the first frequency domain to the time domain.

6. The method of claim 4, wherein the neural network model is a deep neural network.

7. The method of claim 6, wherein the deep neural network comprises gated recurrent units.

8. The method of claim 1, wherein obtaining the noise-suppressed audio output signal by scaling the processed audio signal in the second frequency domain using the machine learning-based noise suppression comprises:

transforming the processed audio signal from the time domain into the second frequency domain comprising a plurality of frequency sub-bands;

generating a feature vector from the processed audio signal in the plurality of frequency sub-bands;

obtaining a set of sub-band gain values by applying a neural network model to the feature vector;

scaling, according to the sub-band gain values, the processed audio signal in the plurality of frequency sub-bands to generate the noise-suppressed audio output signal; and transforming, after scaling according to the sub-band gain values, the noise-suppressed audio output signal from the second frequency domain to the time domain.

9. A method for hybrid noise suppression, comprising:

obtaining a noisy audio input signal;

generating a noise-suppressed audio output signal by performing a combination of a noise spectrum estimate-based noise suppression and a machine learning-based noise suppression; and outputting the noise-suppressed audio output signal, wherein performing the combined noise spectrum estimate-based and machine learning-base noise suppression comprises:

transforming the noisy audio input signal from a time domain into the frequency domain comprising a plurality of frequency sub-bands;

obtaining a noise estimate in the plurality of frequency sub-bands;

determining a first set of sub-band gain values configured to remove the noise estimate from the noisy audio input signal;

generating a feature vector from the noisy audio input signal in the plurality of frequency sub-bands;

determining a second set of sub-band gain values by applying a neural network model to the feature vector;

combining the first set of sub-band gain values and the second set of sub-band gain values to form a combined set of sub-band gain values;

scaling, according to the combined set of sub-band gain values, the noisy audio input signal in the plurality of frequency sub-bands to obtain the noise-suppressed audio output signal; and transforming, after scaling, the noise-suppressed audio output signal from the frequency domain to the time domain.

10. A system for hybrid noise suppression, comprising:

an audio source; and a computing system configured to:

obtain a noisy audio input signal from the audio source;

generate a noise-suppressed audio output signal by performing a combination of a noise spectrum estimate-based noise suppression and a machine learning-based noise suppression, wherein performing the combination further comprises:

obtaining a processed audio signal by scaling the noisy audio input signal in a first frequency domain using the noise spectrum estimate-based noise suppression, and obtaining the noise-suppressed audio output signal by scaling the processed audio signal in a second frequency domain using the machine learning-based noise suppression; and output the noise-suppressed audio output signal.

11. The system of claim 10, wherein the system is a teleconferencing device, and wherein the audio source is a microphone.

12. The system of claim 10, wherein obtaining the processed audio signal by scaling the noisy audio input signal in the first frequency domain using the noise spectrum estimate-based noise suppression comprises:
transforming the noisy audio input signal from a time domain into the first frequency domain comprising a plurality of frequency sub-bands;
obtaining a noise estimate in the plurality of frequency sub-bands;
obtaining the processed audio signal by removing the noise estimate from the noisy audio input signal for the plurality of frequency sub-bands; and
transforming, after obtaining the processed audio signal, the processed audio signal from the first frequency domain to the time domain.

13. The system of claim 10, wherein obtaining the noise-suppressed audio output signal by scaling the processed audio signal in the second frequency domain using the machine learning-based noise suppression comprises:
transforming the noisy audio input signal from a time domain into the second frequency domain comprising a plurality of frequency sub-bands;
generating a feature vector from the noisy audio input signal in the plurality of frequency sub-bands;
obtaining a set of sub-band gain values by applying a neural network model to the feature vector;
transforming the processed audio signal from the time domain into the second frequency domain comprising the plurality of frequency sub-bands;
scaling, according to the sub-band gain values, the processed audio signal in the plurality of frequency sub-bands to generate the noise-suppressed audio output signal; and
transforming, after scaling according to the sub-band gain values, the noise-suppressed audio output signal from the second frequency domain to the time domain.

14. The system of claim 13, wherein the computing system is further configured to, prior to transforming the noisy audio input signal from the time domain to the second frequency domain:
perform an echo cancellation on the noisy audio input signal in the first frequency domain; and
transform, after the echo cancellation, the noisy audio input signal from the first frequency domain to the time domain.

15. The system of claim 13, wherein the neural network model is a deep neural network.

16. The system of claim 10, wherein obtaining the noise-suppressed audio output signal by scaling the processed audio signal in the second frequency domain using the machine learning-based noise suppression comprises:
transforming the processed audio signal from the time domain into the second frequency domain comprising a plurality of frequency sub-bands;
generating a feature vector from the processed audio signal in the plurality of frequency sub-bands;
obtaining a set of sub-band gain values by applying a neural network model to the feature vector;
scaling, according to the sub-band gain values, the processed audio signal in the plurality of frequency sub-bands to generate the noise-suppressed audio output signal; and
transforming, after scaling according to the sub-band gain values, the noise-suppressed audio output signal from the second frequency domain to the time domain.

17. A system for hybrid noise suppression, comprising:
an audio source; and
a computing system configured to:
obtain a noisy audio input signal from the audio source;
generate a noise-suppressed audio output signal by performing a combination of a noise spectrum estimate-based noise suppression and a machine learning-based noise suppression; and
output the noise-suppressed audio output signal,
wherein performing the combined noise spectrum estimate-based and machine learning-base noise suppression comprises:
transforming the noisy audio input signal from a time domain into the frequency domain comprising a plurality of frequency sub-bands;
obtaining a noise estimate in the plurality of frequency sub-bands;
determining a first set of sub-band gain values configured to remove the noise estimate from the noisy audio input signal;
generating a feature vector from the noisy audio input signal in the plurality of frequency sub-bands;
determining a second set of sub-band gain values by applying a neural network model to the feature vector;
combining the first set of sub-band gain values and the second set of sub-band gain values to form a combined set of sub-band gain values;
scaling, according to the combined set of sub-band gain values, the noisy audio input signal in the plurality of frequency sub-bands to obtain the noise-suppressed audio output signal; and
transforming, after scaling, the noise-suppressed audio output signal from the frequency domain to the time domain.

18. A non-transitory computer readable medium comprising computer readable program code for hybrid noise suppression, the computer readable program code causing a computer system to:
obtain a noisy audio input signal;
generate a noise-suppressed audio output signal by performing a combination of a noise spectrum estimate-based noise suppression and a machine learning-based noise suppression, wherein performing further comprises:
obtaining a processed audio signal by scaling the noisy audio input signal in a first frequency domain using the noise spectrum estimate-based noise suppression;
scaling the processed audio signal in a second frequency domain using the machine learning-based noise suppression; and
output the noise-suppressed audio output signal.

* * * * *